United States Patent Office 3,047,604
Patented July 31, 1962

---

3,047,604
PROCESS FOR MANUFACTURE OF ETHYL SULFURIC ACID
Martin Leatherman, Bel Air, Md., assignor to the United States of America as represented by the Secretary of the Navy
No Drawing. Filed Nov. 14, 1958, Ser. No. 774,068
1 Claim. (Cl. 260—459)
(Granted under Title 35, U.S. Code (1952), sec. 266)

The invention described herein may be manufactured and used by or for the Government of the United States of America for governmental purposes without the payment of any royalties thereon or therefor.

This invention relates to a new and improved process for the production of ethyl sulfuric acid. More specifically the invention relates to an improved process for the manufacture of anhydrous ethyl sulfuric acid for use in the preparation of diethyl sulfate.

Of the neutral alkyl esters of sulfuric acid diethyl sulfate, $(C_2H_4)_2SO_4$, has been found to be extremely useful as an alkylating agent and has been extensively employed in the production of explosives and gun propellants.

The production of diethyl sulfate is accompanied by many difficulties because of the numerous reactions which can be entered into by the raw materials from which diethyl sulfate can theoretically be synthesized. The reactions involve ethyl groups and sulfuric acid the interaction of which leads more easily to the production of undesired compounds such as ethylene, ether, alcohol and various degradation products rather than to diethyl sulfate.

One prior art method for the preparation of diethyl sulfate is the direct distillation of pure anhydrous ethyl sulfuric acid described in United States Patent No. 1,411,215 to E. Kuh as shown by the following equation:

(I) 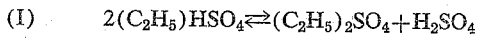
$$2(C_2H_5)HSO_4 \rightleftarrows (C_2H_5)_2SO_4 + H_2SO_4$$

This reaction however requires as a starting ingredient pure anhydrous ethyl sulfuric acid since if water is present the ethyl sulfuric acid reacts with the water upon heating and ethyl alcohol distills over as the only recoverable product as shown by the following equation:

(II) 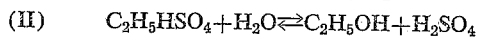
$$C_2H_5HSO_4 + H_2O \rightleftarrows C_2H_5OH + H_2SO_4$$

When the reaction of Equation II is reversed and ethyl alcohol and concentrated sulfuric acid are mixed in equivalent amounts, the accompanying reaction produces ethyl sulfuric acid but the water which is simultaneously formed causes the reaction to stop short of completion. When equimolar proportions of 96% acid and 95% ethyl alcohol are caused to react under favorable conditions the reaction reaches equilibrium at about sixty percent of completion. Such a partially reacted mixture cannot be used economically in the production of diethyl sulfate.

The prior art also discloses that if anhydrous ethyl sulfuric acid is dispersed in heated anhydrous sodium sulfate and subjected to a vacuum distillation at a pressure of about 15 mm. of mercury, diethyl sulfate will distill over to the extent of about 85% of the theoretical yield. However, if the ethyl sulfuric acid is impure and not anhydrous the yield is much reduced due to the reaction shown in Equation II.

The removal of water formed in the preparation of ethyl sulfuric acid through the reaction of ethyl alcohol and sulfuric acid involves various difficulties. A satisfactory dehydrant must not react with or dissolve in either alcohol or ethyl sulfuric acid. It must be easily removed from the ethyl sulfuric acid when the absorption or removal of the water is complete and no water may be left behind in the reaction product.

Various dehydrants are known for removing water from ethyl alcohol but these are not suitable for use in the strongly acidic mixture of ethyl alcohol and sulfuric acid. Some dehydrants such as anhydrous powdered or granular calcium sulfate, are effective dehydrants for ethyl sulfuric acid but cannot be easily separated from the ethyl sulfuric acid and reclaimed for future use, or, if readily separated from the ethyl sulfuric acid, cannot be easily freed of their moisture.

Sodium sulfate has been proposed for dehydrating sulfuric acid (U.S. Pat. No. 475,586 to P. Mauro) and acetic acid (U.S. Pat. No. 1,492,717 to F. E. Lichtenthaeler), however, it was believed that in strongly acid mixtures the sodium sulfate would be changed to sodium bisulfate which has no dehydrating properties and which would be expected to react with the ethyl alcohol left in the ethyl sulfuric acid by the incomplete reaction of the sulfuric acid and ethyl alcohol mixture from which the ethyl sulfuric acid was formed thus forming sodium ethyl sulfate.

It is, therefore, an object of the present invention to provide a new and improved process for the preparation of anhydrous ethyl sulfuric acid.

Another object is to provide a new and improved process for the removal of water from the reaction products of ethyl alcohol and sulfuric acid.

A further object is to provide a new and improved process for the separation of water from a mixture of ethyl alcohol, sulfuric acid, ethyl sulfuric acid and water.

Other objects and the attendant advantages of the invention will become apparent to those skilled in the art as the invention is disclosed in the following description:

Applicant has discovered that, contrary to prior belief, the above objects may be achieved by mixing finely divided sodium sulfate in substantially anhydrous form with a mixture of ethyl alcohol, sulfuric acid, and the ethyl sulfuric acid and water formed by the reaction of the alcohol and the acid without causing the formation of sodium bisulfate and sodium ethyl sulfate and that the water may be removed from this mixture by lowering the temperature of the mixture so prepared below the temperature at which the decahydrate of sodium sulfate gives up its water of hydration. When the temperature of the mixture is lowered below the sharply defined transition point at which the decahydrate of the sodium sulfate gives up its water of hydration, the formation of the decahydrate from the finely divided sodium sulfate will effectively remove the water from the product of the reaction of the sulfuric acid and ethyl alcohol. The temperature at which the decahydrate is formed has been found to be about 32.38° C.

Sodium sulfate produced by any known process may be used in the process of this invention. For best results, however, the sodium sulfate should be anhydrous and in the powdered form. The sodium sulfate should preferably be anhydrous since the presence of any water in the sodium sulfate would necessarily cut down the effectiveness of the removal of water from the product of the ethyl alcohol and the sulfuric acid. The sodium sulfate should also be in the form of a finely divided powder since the more coarsely divided sulfate known as the granular or crystalline form has been found to be considerably less effective over a reasonable period of time.

It has been found that powdered anhydrous sodium sulfate under the conditions of the invention will effectively and essentially quantitatively remove the water from the product of sulfuric acid and ethyl alcohol. One gram molecular weight, i.e. 142 grams, of powdered anhydrous sodium sulfate under the conditions of the invention, is capable of rapidly removing ten gram molecular weights, i.e. 180 grams, of water from the ethyl sulfuric acid, sulfuric acid, ethyl alcohol mixture. It suffices, therefore, merely to estimate the total amount of water present in a given mixture of these materials and then to add the calculated amount of finely divided sodium sulfate to the mixture with stirring.

For example 48.5 grams of 95% ethyl alcohol containing one gram molecular weight of the alcohol and 2.5 grams of water will combine with approximately 103 grams of 95% sulfuric acid containing approximately 5 grams of water. The reaction, if completed will generate 18 grams of additional water making a total of approximately 25.5 grams potentially present in the alcohol-sulfuric acid mixture. Approximately 20 grams of powdered anhydrous sodium sulfate is required to combine with and remove 25.5 grams of water from this mixture. To allow for uncertainties in the water content of the sulfuric acid and ethyl alcohol, an excess (10%) of the powdered anhydrous sodium sulfate is desirable.

The following examples are presented by way of illustration of the process of the invention only and are not to be considered as limiting the invention in any manner.

*Example I*

97 grams of 95% ethyl alcohol were placed in a receptacle cooled by cold water and 206 grams of 95% sulfuric acid added slowly with continued cooling. The temperature of the reaction mixture was then lowered to about 20° C. and 42 grams of powdered anhydrous sodium sulfate were added with rapid stirring to keep the sodium sulfate in suspension. The temperature of the stirred mixture was constantly noted. The temperature of the mixture rose over a period of fifteen minutes to 30° C. The temperature of the mixture was again cooled to 25° C. The temperature again rose to 26° C. and showed no further rise. The hydrated sodium sulfate was then removed from the mixture by suction filtering and the transparent liquid product was then analyzed for water content by the Karl Fischer analytical procedure. This analysis disclosed that no water was present in the ethyl sulfuric acid.

A sieve analysis of the powdered sodium sulfate employed showed the following results: All the powder passed a 60 mesh screen. Five percent was held by a 70 mesh screen, 4% by a 100 mesh screen, 9% by a 140 mesh screen, 9% by a 200 mesh screen, 8% by a 250 mesh screen and 22% by a 325 mesh screen. The balance passed a 325 mesh screen. This powder size is given by way of illustration only and is not intended as limiting the invention in any manner.

*Example II*

The same procedure as in Example I was followed using granular anhydrous sodium sulfate. The stirred mixture showed a temperature rise of only three degrees over a period of two hours. The filtered liquid was analyzed and disclosed a water content of 13 percent indicating that less than 25 percent of the total water potentially present in the reaction mixture had been removed.

It is well known that the addition of concentrated sulfuric acid to 95 percent alcohol generates much heat and the mixing must be done carefully with cooling. However, after sufficient acid has been added to react with the greater part of the alcohol, further addition of acid generates little further heat and may be done rapidly. This appears to be due to the fact that the water formed by the reaction causes an equilibrium to be set up with the reverse reaction absorbing as much heat as the forward reaction generates. The appreciable temperature rise caused by the addition of the anhydrous powdered sodium sulfate to the equilibrated mixture is apparently caused by the removal of water. This removal permits the formation of the ethyl sulfuric acid to go to completion, with the accompanying generation of further heat.

From the foregoing it may be seen that there has been provided a process whereby essentially anhydrous ethyl sulfuric acid may be produced from the reaction of 95 percent ethyl alcohol and concentrated sulfuric acid. This anhydrous ethyl sulfuric acid may be subjected to direct distillation as described above to produce diethyl sulfate in high yield.

Obviously many modifications and variations of the present invention are possible in the light of the above teachings. It is therefore to be understood that within the scope of the appended claim the invention may be practiced otherwise than as specifically described.

What is claimed as new and desired to be secured by Letters Patent of the United States is:

The method of preparing anhydrous ethyl sulfuric acid which comprises reacting ethyl alcohol and sulfuric acid, thereby obtaining ethyl sulfuric acid and water as products of the said reaction, adding anhydrous sodium sulfate in the form of a finely divided powder, such that about 22% of said powder is held back by a 325 mesh screen, the balance of said powder passing said screen and in a concentration of at least one mole of sulfate for every ten moles of water formed and reducing the temperature of the reaction mixture to below about 32.38° C., the temperature at which the decahydrate of sodium sulfate is formed, and separating the hydrated sodium sulfate from the reaction mixture.

References Cited in the file of this patent

UNITED STATES PATENTS

| 1,411,215 | Kuh | Mar. 28, 1922 |
| 1,427,215 | Lilienfeld | Aug. 29, 1922 |

OTHER REFERENCES

Suter: "The Organic Chemistry of Sulfur," 1944, pages 23 and 25. (Copy in Scientific Library.)